Oct. 28, 1969

J. A. LAUCK 3,474,736

PRESSURE LOADED GEAR PUMP

Filed Dec. 27, 1967

Inventor
John A. Lauck
By [signature]
Attorney

United States Patent Office

3,474,736
Patented Oct. 28, 1969

3,474,736
PRESSURE LOADED GEAR PUMP
John A. Lauck, Benton Harbor, Mich., assignor, by mesne assignments, to Koehring Company, Milwaukee, Wis., a corporation of Wisconsin
Filed Dec. 27, 1967, Ser. No. 693,870
Int. Cl. F04c 1/04; F04b 21/08
U.S. Cl. 103—126          8 Claims

ABSTRACT OF THE DISCLOSURE

A cover contacting the front bearings receives only axial thrust imposed on the latter through the intermeshed gears by pressure loading of the rear bearings. Detachment of a mounting member from the rear of the pump body provides access to the drive shaft seal. Unbalanced bearing loads are minimized by communicating the high pressure side of the pump with a fixed zone at one axial end of each gear swept by its teeth and near to but at all times isolated from the low pressure side by one gear tooth.

---

This invention relates to high pressure gear pumps, and has more particular reference to gear pumps of the pressure loaded type.

Such pumps generally comprise a housing having a body with a pumping cavity containing a pair of intermeshing gears fixed to shafts that are journalled for rotation on parallel axes in pairs of bearings at opposite axial ends of each gear. In the pasts, it was customary to confine one bearing of each pair thereof in the bottom portion of the cavity, and to mount the other bearings in a cover closing the cavity at the front of the body.

This practice was resorted to despite the fact that it entailed very accurate and costly boring of both the pump body and the cover in order to assure precise alignment of the gears and their bearings. Moreover, in pumps having floating pressure loaded thrust plates or bearings, it was possible for the cover to shift slightly under pressure cycling of the pump and cause binding of the floatong thrust plate or bearing in a manner such as to prevent establishment of the desired pumping seals at the axial ends of the gears.

To assure against such shifting of the cover and the bearings mounted therein, it became necessary to dowel the cover to the pump body. Needless to say, this expedience also added to manufacturing costs.

It is one of the objectives of this invention to overcome the problems mentioned above and at the same time effect a reduction in the cost of producing pressure loaded gear pumps. This objective is achieved by providing a single pocket in the body of the pump in which the gears and their bearings are mounted in the precise alignment desired, and by the provision of a cover that retains the gears and their bearings in said pocket and which receives only the axial thrust resulting from pressure loading. Hence, all radial load forces on the bearings are carried into the pump body, and accurate boring and doweling of the cover becomes necessary.

It is also an object of this invention to provide a gear pump of the character described wherein pump fluid can be maintained in and circulated through reservoirs provided by clearance spaces between the cover and the adjacent pump bearings, so as to enable any excess journal heat to be dissipated through the cover.

Another object of the invention resides in the provision of a pressure loaded gear pump of the character described, wherein unbalanced load forces on the bearings is substantially reduced.

These unbalanced load forces result from the fact that during pumping, fluid under pressure will be present in the gear tooth spaces from the zone at which the gears intermesh to points diametrically opposite the meshing zone on the output side of the gears, while the tooth spaces on the input side of the gears will have no pressure at all. Consequently the pressure of fluid in the gear tooth spaces on the output side produces strong radial thrusts upon the ears and their bearings, which result in short bearing life.

It will also be seen that the rear bearing thrust flanges are also subjected to unbalanced axial load forces. While there can be a constant output pressure in the chambers behind them to urge them forwardly, their seal faces are exposed to fluid in the gear tooth spaces on the output side of the gears at substantially the same pressure as obtains in their chambers. Fluid in the gear tooth spaces thus opposes the effect of chamber pressure on the flanges at the output side of the gears but does not do so on their input side. As a result, the rear bearings tend to be skewed out of alignment with the front bearings, and to be thereby further subject to rapid wearing.

Attempts have been made in the past to reduce the seriousness of such unbalanced loading of the pump bearings, chiefly through efforts to fill one or more of the gear tooth spaces with pressure fluid on the input side of the gears. These attempts, however, have always left much to be desired, and never achieved a really significant reduction in load unbalance on the pump bearings.

With this in mind, it is a further object of the invention to provide a gear pump wherein unbalance in the bearings loads is reduced far beyond the value possible heretofore.

More specifically, it is a purpose of this invention to minimize unbalance in the bearings loads by the expedient of conducting pump output fluid to a fixed zone opposite one axial end of each gear that is swept by the teeth of the gear, and which zone is located near the pump inlet but at all times isolated therefrom by one gear tooth.

Still another object of the invention resides in the provision of a pressure loaded gear pump featuring bearings having substantially annular thrust flanges located in a single pocket containing the pump gears, and wherein a series of circumferential grooves in the periphery of each pressure loaded bearing reduces the area in contact with the walls of the pocket and thus serves to reduce the force required to hold the bearing flange against the adjacent end of its gear. This construction also achieves the further advantage in that the grooves act as a trap for foreign particles present in any hydraulic system and which would otherwise interfere with the floating action of the pressure loaded bearings.

Another object of the invention resides in the provision of a gear pump of the character described wherein access can be easily had to the drive shaft seal by detachment of a mounting member from the end of the housing remote from the cover.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate two complete examples of the physical embodiment of the invention constructed according to the best modes so far devised for the practical application of the principles thereof, and in which.

Figure 1:
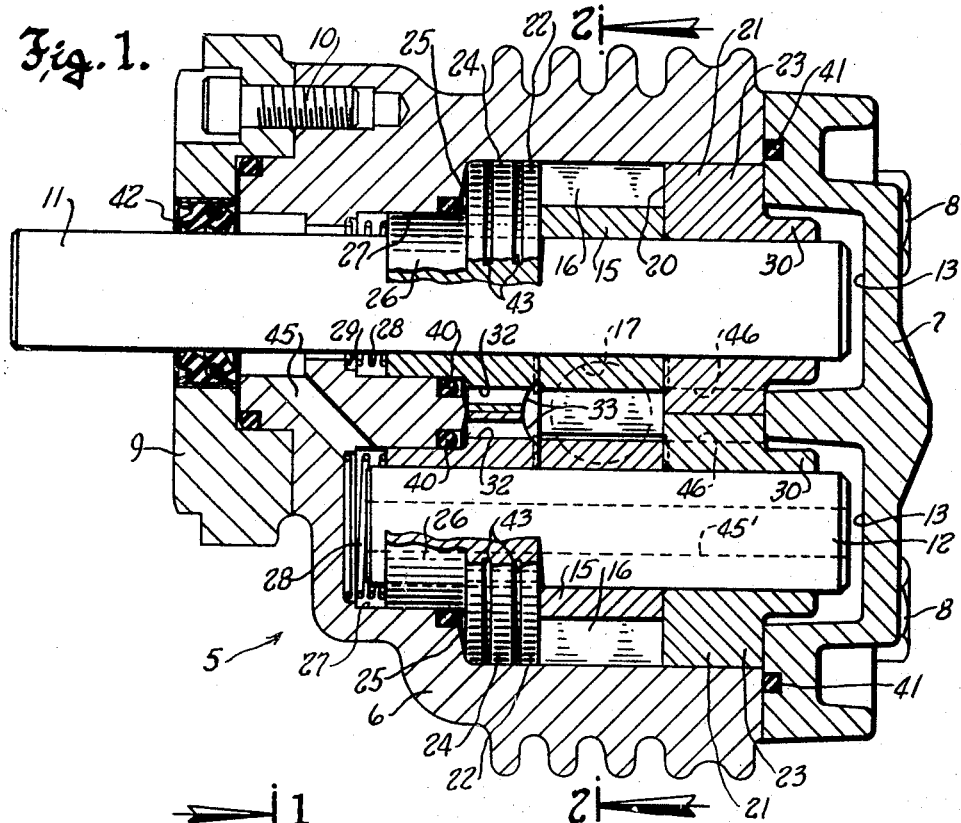
FIGURE 1 is a longitudial sectional view through a pressure loaded gear pump embodying this invention, and taken on the line 1—1 in FIGURE 2.

Referring now more particularly to the drawings, the numeral 5 generally designates the housing for the pump of this invention. The housing is comprised of three parts, namely a main body casting 6, a cover 7 secured by bolts 8 to the front of the body, and a mounting member or pad 9 secured to the rear of the body by three bolts 10, only one of which can be seen in FIGURE 1.

A drive shaft 11 and an idler shaft 12 are journalled in the housing for rotation on spaced apart parallel axes extending fore and aft of the housing. The forward ends of these shafts terminate within wells 13 in the underside of the cover 7. The rear end of the drive shaft 11 extends outwardly beyond the mounting pad 9 for connection with a suitable prime mover. The idler shaft 12 can be located entirely within the housing, as shown.

Figure 2:
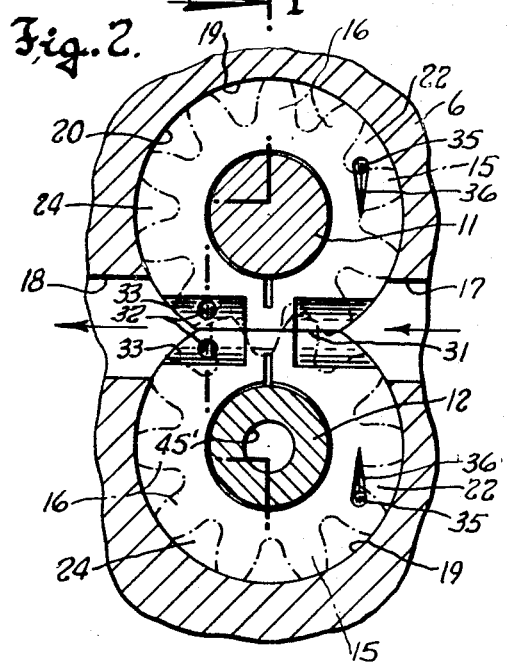
FIGURE 2 is a cross sectional view through the pump cavity, taken on the line 2—2 in FIGURE 1, but showing the gears in broken lines so as to better illustrate the seal faces of the rear bearing flanges.

Each shaft has a gear 15 fixed thereto so as to rotate therewith, and the teeth 16 of the two gears have intermeshing engagement at a zone between the axes of the drive and idler shafts, and intermediate the inlet 17 and outlet 18 of the pump as seen in FIGURE 2. The gears 15 operate in the lobes 19 of a pumping cavity 20 having the cross sectional shape of a figure 8. The lobes 19 of the cavity are formed by parallel laterally intersecting bores which open to the front of the body 6.

The cavity 20 is closed by the cover 7, and has a depth sufficient to accommodate the substantially annular flanges 21 and 22 of front and rear bearings 23 and 24, respectively, for each shaft. Adjoining flange portions of the bearings are slabbed off so as to provide for flat mating engagement thereof as at 31. The remaining peripheral portions of the bearing flanges closely but slidably fit the wall of the cavity 20; and the rear bearings 24 can be moved axially forwardly therein in consequence of delivery of pressure fluid from the pump outlet 18 to a chamber 25 in the bottom of the cavity behind each rear bearing flange 22.

The flanges on the bearings for each gear have flat opposing seal faces normal to the axes of the shafts and which are adapted to be firmly intimately engaged with the flat axial ends of the gear to establish pumping seals therebetween when the rear bearing is pressure loaded by pump output fluid in its chamber 25. The fluid pressure force relied upon to establish such pumping seals is, of course, translated through the gears and the front bearing flanges to the cover through its engagement with the front sides of the forward bearing flanges 21.

The bottom of each chamber 25 is preferably more or less frusto-conical so as to provide a surface which recedes rearwardly at an angle of about 8° out of normal to the axis of the rear bearing. The purpose of this is to preclude the danger of the rear bearing flanges sticking to the bottoms of their chambers and to create adequate space for good pressure loading.

Portions of the rear bearings which have the appearance of hubs 26 smaller in diameter than the flanges 22 thereof project rearwardly therefrom through the chambers at the bottom of the pumping cavity 20 into suitable bores 27 in the body portion 6 of the pump housing and are acted upon by springs 28 that bias the rear bearings forwardly with force sufficient to establish priming seals between the gears and their bearings. One of these springs seats against an internal land 29 in the bore in which the drive shaft is accommodated, and the other seats against the rear wall of the pump body 6.

Similar hub-like portions 30 on the front bearings project forwardly from their flanges 21 beyond the plane of the underside of the cover 7 and into the wells 13 of the cover, in which they are received with substantial clearance between them and the surrounding walls of the wells. Accordingly, the cover is not relied upon to maintain alignment of the bearings, and while it serves as a retainer for the gear and bearing assemblies, it receives only the axial thrust on the bearings resulting from preloading the rear bearings.

Preloading of each rear bearing is accomplished through the provision of a hole 32 therein communicating at one end with its chambers 25 and at its other end with the pump outlet 18. The forward or inlet ends of the holes 32 open to the seal faces of their respective rear bearings at zones which are swept by the teeth of the gears at the output side thereof, and the seal faces are preferably relieved as at 33 at said zones so that output fluid will be free to flow into the holes without obstruction from the gear teeth.

According to this invention, unbalanced loads on the bearings that result from the presence of fluid in the spaces between the teeth of the gears at high pressure on their output side and at low pressure on their input side, is significantly reduced and minimized to assure long bearing life. To this end, high pressure fluid from the output side of the gears is bled back through passage means to a zone alongside one axial end of each gear and near the pump inlet for flow into the spaces between gear teeth on the input side of the gears as the latter rotate.

Figure 3:
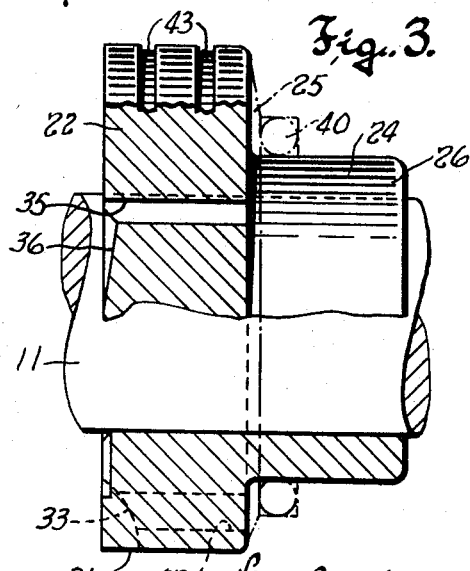
FIGURE 3 is an enlarged view, partly in section and partly in elevation, showing details of construction of one of the floating rear bearings.

FIGURES 1 to 3 best illustrate one way of accomplishing the above purpose. As therein seen, each rear bearing 24 is provided with a hole 35 extending axially through its flange 22 radially outwardly from the bearing axis a distance such that the hole will be swept by the root portions of the teeth of its adjacent gear. The hole 35 is spaced from a horizontal plane containing the bearing axis approximately 30° in the direction of rotation of its associated gear. It communicates with the chamber 25 behind the flange so that high pressure output fluid therein can flow forwardly through the hole and debouch into the spaces between teeth on the gear inwardly of its pitch circle, and thus fill up the tooth spaces from their radially innermost portions.

The hole 35 is preferably somewhat smaller in diameter than the hole 32 leading to the chamber 25 from the output side of the pump. This is desirable in that it assures against reduction of pressure in the pressure loaded bearing chamber 25 that might otherwise cause unloading of said pressure when the pump is operating under cavitation conditions.

Also, the seal face of each rear bearing flange is preferably provided with a groove or indentation 36 which extends from the hole 35 to the horizontal plane containing the bearing axis and which is generally parallel to a vertical plane containing the axes of the gears. This groove is deepest at its junction with the hole 35, and it is taperingly reduced in width and depth toward its end remote from the hole.

It is important to note that the shallow pointed end of the groove is located as close as possible to the pump inlet 17 while at the same time assuring that it will be isolated from the inlet by one gear tooth in any position of gear rotation. It is also significant that the root of each tooth space initially registers with the shallow end of the groove 36, and that the degree of communication between said space and the hole 35 increases progressively through the groove as the gear rotates.

The above constitutes an effective, very simple and low cost way of assuring the presence of high pressure fluid in the spaces between gear teeth from the output side of the gears all the way around to near the input side thereof, to thus minimize pressure unbalance that heretofore imposed excessive load forces on the bearings.

Figure 4:
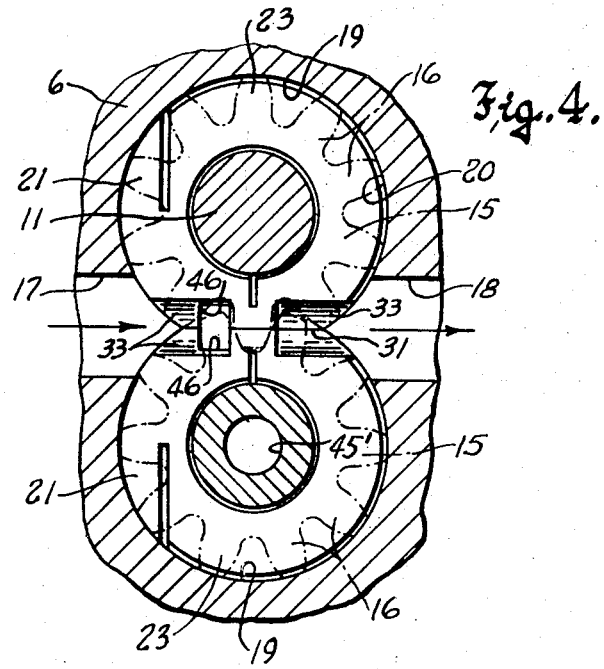
FIGURE 4 is a cross sectional view similar to FIGURE 2, but illustrating the seal faces of the front bearings in a modified version of the pump of this invention.
Figure 5:
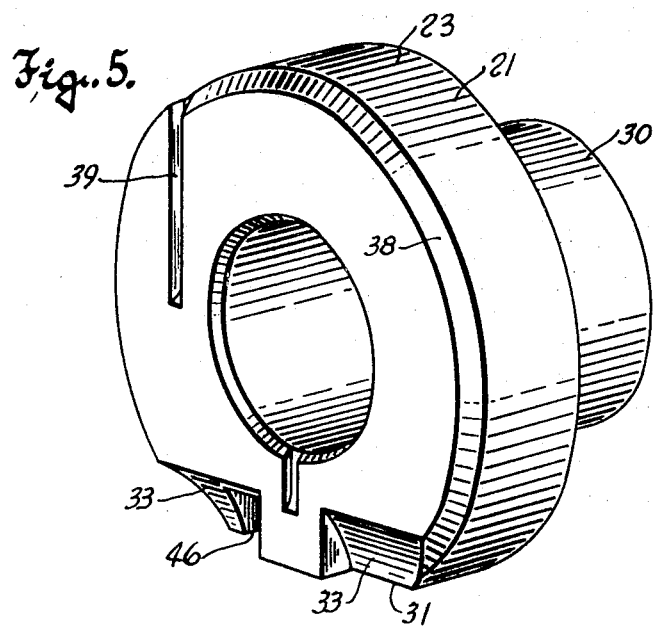
FIGURE 5 is a perspective view of one of the front bearings seen in FIGURE 4, at an enlarged scale.

An equally effective way of accomplishing the same result at only slightly greater cost is shown in FIGURES 4 and 5, where the front bearings 23 are provided with passage means to supply high pressure output fluid to the gear tooth spaces at the input side of the gears. In this case, the passage means comprises a chamfer 38 on the periphery of each front bearing 23, at its seal face side, and a groove 39 in the seal face extending inwardly from the chamfer. The chamfer extends from the flattened portions of the bearing at the zone of meshing engagement of the gear teeth but on the outlet side thereof, around the flange of the bearing in the direction counter to that of rotation of its adjacent gear, to a point approximately 215° from the center of mesh where it connects with the outer end of the groove 39. The latter extends parallel to the common plane containing the gear axes and terminates at a point lying in a horizontal plane containing the axis of the adjacent gear.

Hence, high pressure output fluid can flow through the chamfers 38 and their connecting grooves 39 to the spaces between gear teeth at the input side of the gears. Such fluid will initially flow into the radially innermost portions of the tooth spaces, and, again, communication between the grooves and the tooth spaces progressively increases as each traverses its groove.

If desired, of course, this chamfer and groove expedient can be applied to the rear bearings instead of the front bears, or to both the front and rear bearings.

O-ring seals 40 confined in the bottoms of the chambers 25 for the rear bearings as shown, encircle the reduced hub-like portions of those bearings to prevent leakage of high pressure output fluid from the chambers. In addition, a single large diameter O-ring seal 41 is confined in a groove in the underside of the cover 17 to prevent leakage of fluid outwardly through the joint between the cover and the pump body 6.

It is important to note that the drive shaft seal 42 is located in the mounting pad 9, where it is easily accessible merely by removing the three screws 10 which hold the mounting pad in place. Ordinarily, the shaft seal is incorporated in the pump body, so that in the past it was necessary to completely disassemble the pump in order to replace the seal.

A plurality of axially spaced circumferential grooves 43 is also provided in the periphery of the flange 22 of each of the pressure loaded bearings. The purpose of these grooves is to reduce the area of the flanges in contact with the wall of the pumping cavity, to thus also reduce the force required to hold the rear bearings against the adjacent ends of the gears; and to also enable foreign particles which inevitably collect in any hydraulic system to be trapped in the grooves without interfering with the floating action of the pressure loaded rear bearings.

It is also significant to note that the wells 13 in the underside of the cover 7 provide reservoirs to hold a substantial quantity of oil around the hub-like forward ends of the front bearings, so as to provide for dissipation of any excess journal heat. Since these wells communicate with both the inlet and the outlet sides of the pump through slight clearance spaces in the bores of the bearings, there will always be some circulation of fluid through the wells for cooling purposes. Some of the high pressure leakage fluid will, of course, flow rearwardly through the clearance spaces in the floating rear bearing 24 for the drive shaft and the chamber in which its spring 28 is located, to a passage 45 leading to the spring chamber 27 associated with the idler shaft rear bearing. From there, the fluid will flow forwardly through an axial passage 45' in the idler shaft to the reservoir provided by the well in the cover in which the forward end of the idler shaft is received. Passages 46 in the front bearings, at their junction 31, provide for return flow of fluid from the wells 13 to the pump inlet 17.

From the foregoing description, together with the accompanying drawings, it will be readily apparent to those skilled in the art that this invention provides a pressure loaded gear pump which features simplicity and lower cost of manufacture while at the same time having greater bearing life and improved operating characteristics.

What is claimed as my invention is:

1. A gear pump comprising a pair of gears journalled for rotation on parallel axes in a housing having an inlet and an outlet at opposite sides of the location at which the teeth of the gears intermesh, and an axially movable thrust member for each gear, urged by pressure of pump output fluid in a pressure chamber behind the thrust member to engage a seal face thereon with the adjacent end of the associated gear to maintain pumping seals at the opposite ends of the gear, said pump being characterized by:

(A) passage means in each thrust member comprising a hole therein communicating with the pressure chamber thereof and opening to the seal face of the thrust member through a groove therein located at a fixed zone swept by the teeth of the adjacent gear;

(B) each groove being near the inlet but spaced therefrom in the direction of rotation of its associated gear such that one gear tooth is always interposed between the groove and said inlet;

(C) and each groove having a wide portion to which its associated hole opens, and being taperingly reduced in width and depth toward said inlet so that the extent of communication between each tooth space and said hole increases progressively as the gear rotates.

2. A pressure loaded gear pump having a housing with an inlet and an outlet, and in which there are a driving gear and an idler gear that meshingly engage one another in a zone between the inlet and the outlet, a pair of front thrust members, one confined between the front end of each gear and a front wall of the housing, and a pair of axially movable rear thrust members, one at the rear end of each gear and urged forwardly by pressure of output fluid in a chamber conjointly defined by the housing and the rear thrust member, said pump being further characterized by:

(A) one thrust member for each gear having restricted passage means for delivering high pressure output fluid to a zone which is
  (1) swept by the teeth of its gear at one end thereof,
  (2) and intermediate the inlet and the outlet and remote from the zone of meshing;

(B) said passage means having its outlet near the pump inlet but isolated therefrom by one tooth of the adjacent gear in any position of gear rotation;

(C) and said passage means being defined by
  (1) a bevel around the outer edge of the gear side of said one thrust member defining a groove that communicates with the pump outlet and extends to a point about 215° in the direction counter to gear rotation from the center of said zone of meshing engagement of the gears,
  (2) and a continuing groove in the gear side of said one thrust member that extends from said point in a direction substantially parallel to a plane containing the gear axes substantially to a line through the axis of the adjacent gear and at right angles to said plane.

3. A pressure loaded gear pump having a housing with an inlet and an outlet, and in which there are a driving gear and an idler gear that meshingly engage one another in a zone between the inlet and the outlet, a pair of front thrust members, one confined between the front end of each gear and a front wall of the housing, and a pair of axially movable rear thrust members, one at the rear end of each gear and urged forwardly by pressure of output fluid in a chamber conjointly defined by the housing and the rear thrust member, said pumps being further characterized by:
- (A) one thrust member for each gear having restricted passage means for delivering high pressure output fluid to a zone which is
  - (1) swept by the teeth of its gear at one end thereof,
  - (2) and intermediate the inlet and the outlet and remote from the zone of meshing;
- (B) said passage means having its outlet near the pump inlet but isolated therefrom by one tooth of the adjacent gear in any position of gear rotation;
- (C) and said restricted passages means comprising
  - (1) a hole through each rear thrust member communicating with said chamber and opening to its gear side at a zone swept by the roots of the gear teeth and intermediate the pump inlet and a point diametrically opposite the zone of meshing engagement of the gears;
  - (2) and a groove in the gear side of each rear thrust member, said grooves extending from said holes toward the pump inlet and being taperingly reduced in width and depth from said holes.

4. A gear pump having an inlet and an outlet at opposite sides of the zone at which the teeth of the gears intermesh, and a surface in thrust transmitting relation to one axial end of each gear, characterized by:
- (A) passage means associated with each gear and connected with said outlet, said passage means terminating in a groove in said surface adjacent to said one axial end of the gear;
- (B) said grooves being elongated lengthwise of a plane containing the gear axes and spaced from said plane in the direction of said inlet;
- (C) each of said grooves extending lengthwise toward the inlet but spaced therefrom a distance such that one gear tooth is always interposed between it and the inlet;
- (D) and each of said grooves being disposed with its end nearest the inlet located at a point contiguous to the root circle of the teeth of its adjacent gear, and with the remainder of the groove diverging away from said root circle, in nonconcentric relation thereto.

5. A pressure loaded gear pump having a housing with a pumping chamber, a pair of parallel shafts extending fore and aft in the housing and through the pumping chamber, and gears in the chamber fixed on said shafts intermediate their ends and in intermeshing engagement with one another, said pump being characterized by:
- (A) the housing comprising
  - (1) a body having the pumping chamber therein and opening forwardly thereof,
  - (2) and a cover secured to the front of the body to close the pumping chamber whereby the underside of the cover provides a thrust receiving surface and an end wall for the chamber opposite the end wall provided by the bottom of the chamber, said cover having wells in its underside opening through said thrust receiving surface to the chamber in line with the gear shafts;
- (B) pairs of front and rear bearings mounted in the pumping chamber and in which the gear shafts are rotatably journalled with their gears between the bearings, the rear bearings being axially movable and pressure loaded forwardly, so that said cover surface receives the pressure loading thrust,
  - (1) each of said bearings having an annular portion confined between one end wall of the chamber and the adjacent axial end of its associated gear and in thrust transmitting relation to the latter,
  - (2) and the front bearings having hubs extending axially into the cover wells in spaced relation to the wells thereof,
- (C) and means providing for circulation of fluid from the high pressure side of the gears through said wells, past the bearing hubs therein, and back to the low pressure side of the gears along a path that leads serially in one direction along the exterior of one gear shaft and then in the opposite direction through an axial passage in the other gear shaft.

6. The gear pump of claim 5, further characterized by a plurality of narrow circumferential grooves in the periphery of each pressure loaded rear bearing.

7. A gear pump comprising a pair of gears journalled for rotation on parallel axes in a housing having an inlet and an outlet at opposite sides of the location at which the gear teeth mesh, and pressure loaded bearings for the gears urged by pressure of fluid in a chamber conjointly defined by the housing and said bearings in an axial direction such as to maintain pumping seals between their faces and the adjacent axial ends of the gases, said pump being further characterized by:
- (A) passageway defining means to communicate said outlet with each of the chambers;
- (B) and means for conducting output fluid to the seal face of each of said bearings at a zone substantially diametrically opposite said outlet, said means comprising
  - (1) a passage in each of said bearings opening to the seal face thereof at a location outwardly of the root circle of the teeth on the adjacent gear,
  - (2) and an elongated groove in the seal face of each of said bearings, to which its said passage opens, each of said grooves extending lengthwise from the junction thereof with its respective passage toward the inlet in convergent relation to the root circle of the teeth on the adjacent gear, and having its end nearest the inlet contiguous to said root circle.

8. The gear pump of claim 7, wherein said passageway defining means comprises an axial passageway in each bearing, and said passage in each bearing communicates with the associated chamber and extends axially through the bearing substantially parallel to the passageway therein.

References Cited

UNITED STATES PATENTS

| | | |
|---|---|---|
| 2,820,416 | 1/1958 | Compton. |
| 2,870,720 | 1/1959 | Lorenz. |
| 2,980,028 | 4/1961 | Edwards et al. |
| 3,251,309 | 5/1966 | Schmiel et al. |
| 3,263,620 | 8/1966 | Schofield. |

DONLEY J. STOCKING, Primary Examiner

W. J. GOODLIN, Assistant Examiner

U.S. Cl. X.R.

103—216

PO-1050
(5/69)

UNITED STATES PATENT OFFICE
CERTIFICATE OF CORRECTION

Patent No. 3,474,736          Dated October 28, 1969

Inventor(s) J.A. Lauck

It is certified that error appears in the above-identified patent and that said Letters Patent are hereby corrected as shown below:

Column 1, line 32, "pasts" should be singular. Column 1, line 42-3, "floating" is misspelled. Column 1, line 49, "expedience" should read -- expedient -- . Column 1, line 62, "necessary" should read -- unnecessary -- . Column 2, line 9, "ears" should read -- gears -- . Column 4, line 16, "chambers should be singular. Column 3, line 23, "gases" should read -- gears -- .

SIGNED AND
SEALED
MAY 26 1970

(SEAL)
Attest:

Edward M. Fletcher, Jr.
Attesting Officer

WILLIAM E. SCHUYLER, JR.
Commissioner of Patents